(12) United States Patent
da Silva Ferreira et al.

(10) Patent No.: US 11,500,118 B2
(45) Date of Patent: Nov. 15, 2022

(54) SEISMIC DATA REPRESENTATION AND COMPARISON

(71) Applicant: International Business Machines Corporation, Armonk, NY (US)

(72) Inventors: Rodrigo da Silva Ferreira, Rio de Janeiro (BR); Emilio Ashton Vital Brazil, Rio de Janeiro (BR); Renato Fontoura de Gusmao Cerqueira, Barra da Tijuca (BR)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 16/297,118

(22) Filed: Mar. 8, 2019

(65) Prior Publication Data
US 2020/0284936 A1    Sep. 10, 2020

(51) Int. Cl.
*G01V 1/34* (2006.01)

(52) U.S. Cl.
CPC .................................. *G01V 1/345* (2013.01)

(58) Field of Classification Search
CPC .......... G01V 1/345; G01V 1/32; G01V 1/302; G01V 2210/66; G01V 2210/74; G01V 2210/64; G06K 9/00201; G06K 9/6253; G06K 9/6255
See application file for complete search history.

(56) References Cited

U.S. PATENT DOCUMENTS

| 6,138,075 A | 10/2000 | Yost |
| 6,988,038 B2 | 1/2006 | Trappe et al. |
| 7,020,558 B2 | 3/2006 | Voutay et al. |
| 7,184,991 B1 | 2/2007 | Wentland et al. |
| 2013/0261982 A1* | 10/2013 | Zhang .............................. 702/15 |
| 2014/0278115 A1* | 9/2014 | Bas .................................. 702/14 |
| 2015/0103623 A1 | 4/2015 | Gersztenkom |
| 2016/0313463 A1 | 10/2016 | Wahrmund et al. |

(Continued)

FOREIGN PATENT DOCUMENTS

| CN | 109086773 A | 12/2018 |
| EA | 033897 B1 | 12/2019 |

(Continued)

OTHER PUBLICATIONS

Ferreira, R.S., et al., "Seismic graph analysis to aid seismic interpretation", Interpretation, Aug. 2019, pp. SE81-SE92, vol. 7, No. 3.

(Continued)

*Primary Examiner* — Tarun Sinha
*Assistant Examiner* — Lal C Mang
(74) *Attorney, Agent, or Firm* — Scully, Scott, Murphy & Presser, P.C.; Joseph Petrokaitis

(57) ABSTRACT

A seismic dataset and a task to be performed with the seismic dataset may be received. A representative seismic line representative of the seismic dataset may be generated. The representative seismic line may include pixel data representative of the seismic dataset. Based on the representative seismic line, the task may be performed. The task may include at least finding an analogous geological region by searching for an analogous seismic dataset existing in a seismic database by comparing the representative seismic line with the analogous seismic dataset's representative seismic line.

17 Claims, 10 Drawing Sheets

(56) References Cited

U.S. PATENT DOCUMENTS

2018/0106917 A1    4/2018  Osypov et al.
2018/0300549 A1*  10/2018  Xia ..................... G06K 9/00651
2019/0064389 A1*   2/2019  Denli ................... G01V 99/005
2019/0383965 A1*  12/2019  Salman ................ G01V 99/005

FOREIGN PATENT DOCUMENTS

FR         2989804 A1    10/2013
WO   WO 2001033481 A1 *  5/2001  ............... G01V 1/30
WO      2013/012469 A1    1/2013
WO      2014/070296 A1    5/2014
WO      2018/148492 A1    8/2018

OTHER PUBLICATIONS

International Search Report dated May 20, 2020, issued in PCT/EP2020/055841, 12 pages.
Michelena, R.J., "Similarity analysis: a new tool to summarize seismic attributes information" The Leading Edge, Apr. 1998, 4 pages.
Al-Marzouqi, H., et al., "Similarity index for seismic data sets using adaptive curvelets", SEG Denver 2014 Annual Meeting, Oct. 26-31, 2014 pp. 1470-1474.
Rondon, O., et al., "Seismic similarity analysis through self-organising maps", Exploration Geophysics, Submitted Oct. 27, 2006, Accepted Jul. 30, 2007, Published Sep. 19, 2007, pp. 184-188, 38(3).
Long, Z., et al., "SeiSIM: Structural Similarity Evaluation for Seismic Data Retrieval", Submitted to IEEE Global Conference on Signal and Information Processing (GlobalSIP), Dec. 14-16, 2015, 5 pages.
Ferreira, R.S., et al., "Texture-Based-Similarity Graph to Aid Seismic Interpretation", Search and Discovery Article #70365, Oct. 8, 2018, 14 pages.
Alaudah, Y., et al., "A Curvelet-Based Distance Measure for Seismic Images", 2015 IEEE International Conference on Image Processing (ICIP), Sep. 27-30, 2015, 5 pages.
Ringenbach, J.-C., et al., "Salt Tectonics in the Sivas Basin (Turkey)—Outstanding Seismic Analogues", First EAGE/ASGA Workshop on Petroleum Exploration, Oct. 2-4, 2017, 2 pages.
Bakke, K., et al., "Compound seismic modelling of the Ainsa II turbidite system, Spain: Application to deep-water channel systems offshore Angola", Marine and Petroleum Geology, Received Oct. 19, 2006, Received in Revised form Sep. 23, 2007, Accepted Oct. 1, 2007, pp. 1058-1073, vol. 25.
Back, S., et al., "Growth faults above shale—Seismic-scale outcrop analogues from the Makran foreland, SW Pakistan", Marine and Petroleum Geology, Received Jun. 22, 2015, Received in revised form Nov. 5, 2015, Accepted Nov. 13, 2015, Available online Nov. 24, 2015, pp. 144-162, vol. 70.
Coleman J. L., et al., "Seismic Resolution of Submarine Channel Architecture as Indicated by Outcrop Analogs", Fine-Grained Turbidite Systems, AAPG Memoir 72/SEPM Special Publication 68, Mar. 2000, p. 119-126, Chapter 11.
Pringle, J. K., et al., "Virtual outcrop models of petroleum reservoir analogues: a review of the current state-of-the-art", Technical Article, First Break, Mar. 2006, pp. 33-42, vol. 24.
Grammer, G.M., et al., "Integration of Outcrop and Modern Analogs in Reservoir Modeling: Overview with Examples from the Bahamas", AAPG Memoir 80, Jan. 1, 2004, pp. 1-22.
Twichell, D.C., et al. "Seismic Architecture and Lithofacies of Turbidites in Lake Mead (Arizona and Nevada, USA), an Analogue for Topographically Complex Basins", Journal of Sedimentary Research, Jan. 2005, pp. 134-148, vol. 75, No. 1.
Nibbelink, K., "Modeling deepwater reservoir analogs through analysis of recent sediments using coherence, seismic amplitude, and bathymetry data, Sigsbee Escarpment, Green Canyon, Gulf of Mexico", The Leading Edge, May 1999, pp. 550-561.
Kilhams, B., et al. "An integrated 3D seismic, petrophysical and analogue core study of the Mid-Eocene Grid channel complex in the greater Nelson Field area, UK Central North Sea." Petroleum Geoscience, Apr. 2011, pp. 127-142, vol. 17.
Examination Report received in Indian Patent Application No. 202147045210 dated Mar. 17, 2022, 5 pages.
Office Action received in Russian Patent Application No. 2021 126 507 dated Apr. 15, 2022, 17 pages.
Examination Report received in Australian Patent Application No. 2020239165 dated Aug. 27, 2022, 3 pages.

* cited by examiner

SEISMIC DATA REPRESENTATION AND COMPARISON

BACKGROUND

The present application relates generally to computers and computer applications, and more particularly to image processing of seismic representations.

Seismic images can provide an indirect representation of the subsurface, which may be used in petroleum industry exploration process, for search of oil and gas accumulations. From acquisition to the final product there is a long chain of complex seismic processing. These data sets may have up to terabytes (thousands of seismic lines/images) covering thousands of squared kilometers. While transferring the knowledge from one explored area to a new one can help to accelerate decisions, due to the amount of data available and the time constraints in providing results, processing of those data in a timely manner becomes difficult.

BRIEF SUMMARY

A computer-implemented method, in one aspect, may include receiving a seismic dataset and a task to be performed with the seismic dataset. The method may also include generating a representative seismic line representative of the seismic dataset, the representative seismic line indicative of pixel data representative of the seismic dataset. The method may also include, based on the representative seismic line, performing the task, the task indicating at least finding an analogous geological region by searching for an analogous seismic dataset existing in a seismic database by comparing the representative seismic line with the analogous seismic dataset's representative seismic line.

A system, in one aspect, may include at least one hardware processor. A memory device may be coupled with the at least one hardware processor. The at least one hardware processor may be operable to receive a seismic dataset and a task to be performed with the seismic dataset. The at least one hardware processor also may be operable to generate a representative seismic line representative of the seismic dataset, the representative seismic line indicative of pixel data representative of the seismic dataset. The at least one hardware processor also may be operable to, based on the representative seismic line, perform the task, the task indicating at least finding an analogous geological region by searching for an analogous seismic dataset existing in a seismic database by comparing the representative seismic line with the analogous seismic dataset's representative seismic line.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method, system and techniques are presented, which may efficiently represent seismic data, so that seismic data may be compared, searched for analogs, find effective training data sets for machine learning, and/or others. In one aspect, a system and/or method may automatically compute representation of a seismic dataset, for example, driven by machine learning to select its most representative seismic images and use the selected representation to search for analogous seismic images.

In one aspect, clusters of images may be created based on a corpus of images. In one aspect, each cluster may include a plurality of images of the corpus of images and each image of the corpus of images may be included in only one cluster. For each cluster, a representative image may be selected for the images of the cluster. A user action may be received for the representative image and the user action may be applied to the images of the cluster.

For instance, in a petroleum industry related workflow, there may be very large seismic datasets with seismic lines or images. These datasets can include thousands of images in in-line and cross-line directions or thousands of 2-dimensional (2D) seismic datasets. A seismic analysis may involve manually scanning dozens of seismic images to produce a product referred to as seismic interpretation. For instance, a user selects one of the files, opens it, and visually scans dozens of seismic images, identifying interesting patterns, structures and shapes that are visually coherent and make geological sense. A file may include a large number of embedded seismic images. In some aspect, however, time constraints can make interpreters to analyze a decimated dataset, which may still take a long time (e.g., months) to complete.

In other scenarios, given seismic image data, a user may need to search for an already interpreted analogous seismic data. Such a search may involve searching through a number of seismic datasets and selecting those that are most geologically similar with the area of interest. For instance, such search may be based only on metadata associated with the files, and may identify that a file (e.g., File A) is analogous to another file (e.g., File B), for example, that both seismic data files have similar rock types (lithologies).

Another practical application of using seismic dataset includes applying machine learning algorithms to seismic datasets. In such an application, a training data is selected for training a machine learning model or algorithm, for instance, by analyzing the data and finding suitable dataset for training. In some aspect, manually selecting a training dataset can be time consuming and also may be prone to missing the representative seismic images.

Figure 2:
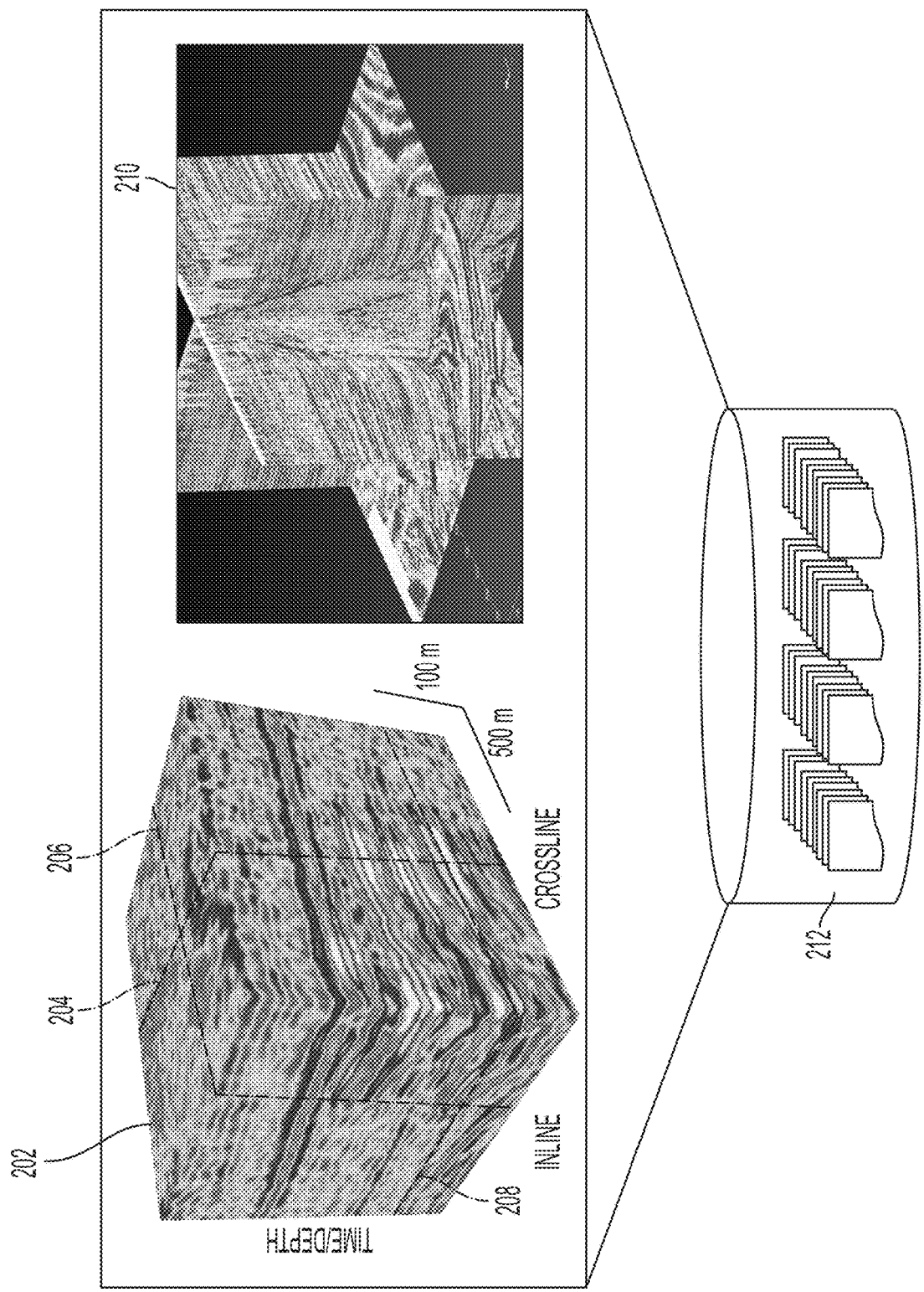
FIG. 2 is a diagram illustrating a storage device storing seismic data in one embodiment.

The term "seismic line" refers to a vertical slice or section of a 3-dimensional (3D) seismic survey taken along the inline or crossline or time/depth axis. FIG. 2 at 202 presents a 3D seismic survey in which three perpendicular cuts were made, shown at 204, 206, 208. The same figure, on the right, presents the three seismic sections (planes) 210 that resulted from these cuts; "seismic survey" can refer to the process of seismic data acquisition. "Seismic survey" in the present disclosure refers to the resulting data of the acquisition process; and "seismic data" or dataset are synonyms for seismic survey.

A system and/or method in some embodiments may implement and use texture-based graph representation of a seismic dataset driven by machine learning to select its most representative seismic images. In one aspect, the system and/or method may allow users to input a query for a list of most representative seismic images (lines) of a seismic dataset and use the returned query result for seismic interpretation and/or training data selection. The system and/or method may also allow users to search for analogous datasets using their most representative seismic images along with their metadata.

The system and/or method in some embodiments allows a user to be able to work from representative seismic lines (adaptive grid) (e.g., the most representative seismic lines), for instance, rather than a decimated version. Using such a representation may also enhance a search performed based on metadata, since a metadata only-based search for analogous seismic datasets may still return a large number of datasets to be analyzed. Being able to use data itself to refine or complement this search may provide a time savings and consequently reduce costs. Machine learning algorithms, which may be sensitive to training data quality, may also benefit from being trained based on representative seismic dataset or lines, resulting in generated models with higher classification or prediction accuracies.

Figure 1:
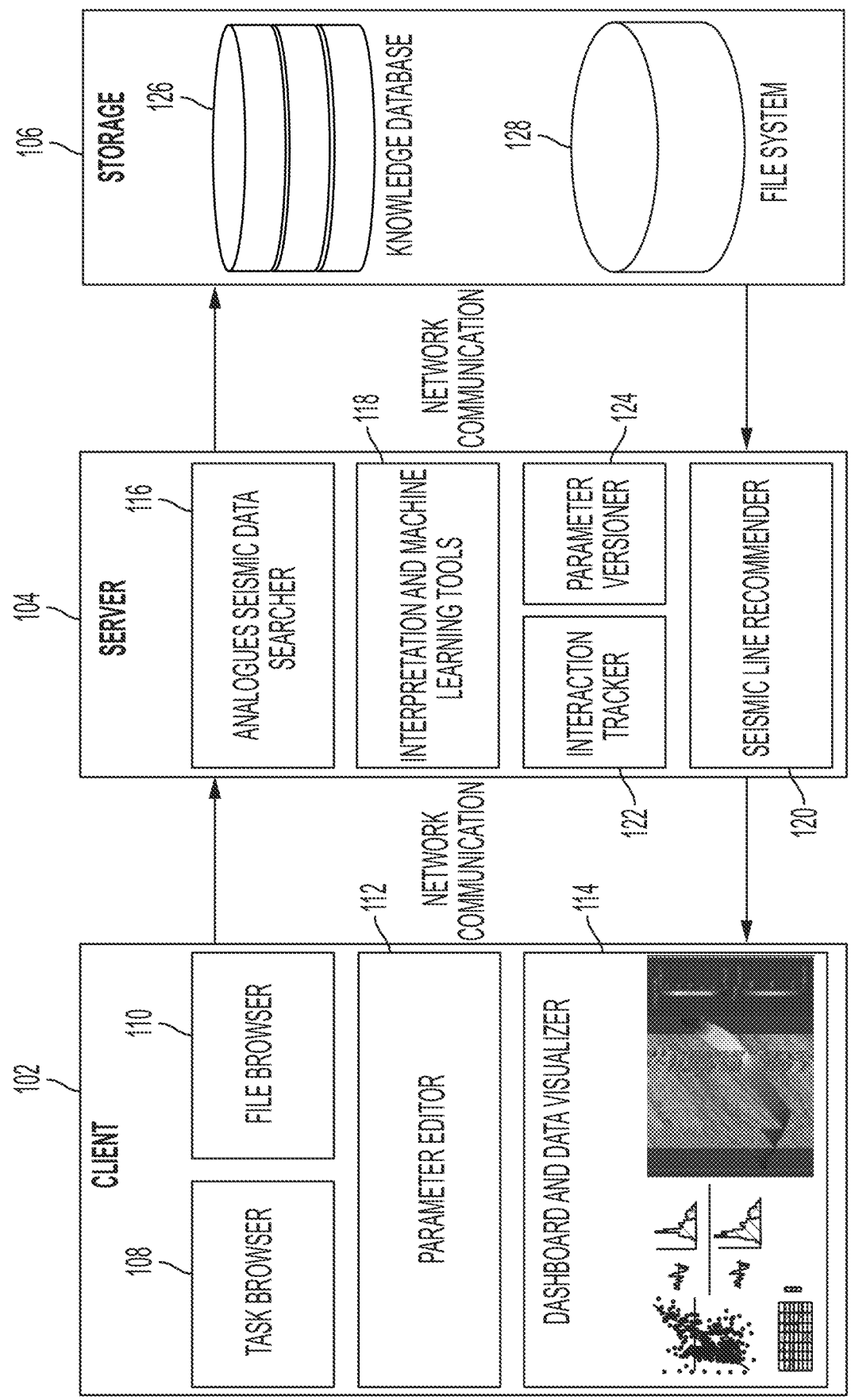
FIG. 1 shows overall system architecture in one embodiment.

FIG. 1 shows overall system architecture in one embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A system in some embodiments may be implemented as a client-server, and/or distributed environment. Other computing environment may be contemplated. Referring to FIG. 1, a client device 202 may communicate with a server device 204, for example, over a communication network. A server device 204 may communicate with one or more data systems 206, which includes one or more storage devices storing data such as knowledge database 126 and file system 128 storing seismic data.

A client device 102 may include a task browser functionality or component 108, which allows a user to view tasks, select a task and/or enter a task to be performed associated with seismic data. A file browser functionality or component 110 allows a user to view seismic data saved in computer files, and for example, stored in a storage device, for example, on a file system 128. The task browser 108 and the file browser 110 components may communicate with the server device 104, which may retrieve requested data from the data system 106 and transmit to the client device 102, for instance, for presentation to a user. A parameter editor functionality or component 112 allows a user to enter and/or edit parameters and parameter values, for example, associated with performing a task. A dashboard and data visualizer functionality or component 114 may present various data, for example, including results of a task performed. Components of the client device 102 may be part of, or coupled with, a user interface, which includes functionalities for computer-user interactions, and display and/or other presentation capabilities.

A server device 104 may include functionalities or components that perform or invoke tasks such as searching for analogous seismic dataset 116 and interpreting seismic data and performing machine learning related functions 118. The server device 204 also includes a seismic line recommender functionality or component 120, which computes or generates representative seismic lines associated with seismic datasets. An interaction tracker functionality or component 122 may monitor and track user interactions and store the interactions in a knowledge database 126. A parameter versioner functionality or component 124 may keep or track versions parameters received from the client device 102.

Via the task browser 108 and file browser 110, a user may select a task and a seismic dataset. Based on previous interaction data, for example, stored in the knowledge database 126, the server device 104 may automatically select parameter values for recommending the most representative lines. The parameter values are suggested according to the selected task. Examples of parameters may include, but are not limited to, tile size, texture descriptor and clustering algorithm. The value of a parameter is recommended based on a statistical analysis of the values for that parameter that led to successful results in previous executions of similar tasks, according to the user feedback (e.g., shown at 306 to 318 in FIG. 3). Using the retrieved parameter values the seismic line recommender 120 may perform an analysis of the given or selected seismic dataset and recommend one or more representative seismic lines. The representative seismic lines may be presented to a user, for example, via a user interface, running on the client device 102, and allow the user to validate the seismic lines returned by seismic line recommender 120.

A user may edit or change parameter values and run the seismic line recommender again, for instance, if the returned seismic lines are not satisfactory to the user. For instance, there may be too many seismic lines returned that are similar, or there may be too few seismic lines returned, and the user may want to check whether any structures were missed.

Based on the returned seismic lines, for example, if the returned seismic lines are satisfactory to the user, the user may perform various tasks such as seismic interpretation and machine learning related tasks. For instance, given an indication via a user interface that the user approves the seismic lines, the client device 102 may automatically communicate with the server device 104 for the server device 104 to invoke a functionality which performs a seismic interpretation 118. Results of such seismic interpretation may be transmitted to the client device 102, which may present the results via the dashboard and data visualize component 114. The user may be also allowed to validate or provide a feedback as to whether the seismic lines helped the user with the task. The user may also change parameter values to receive a different set of representative seismic lines. With this feedback process, the system of the present disclosure may be able to suggest more desirable parameters and seismic lines in the future.

Another task a user can perform is a machine learning task. For instance, based on the returned seismic lines, analogous seismic dataset and associated machine learning models may be retrieved. For instance, the server device may invoke the analogous seismic data searcher 116 to retrieve such analogous datasets. A machine learning model may be trained based on the retrieved one or more machine learning models of the analogous seismic dataset, and based on the data of the seismic lines. With this task also, a user may provide a feedback as to whether the seismic lines returned satisfactorily trained a machine learning model, and if not, the user may enter different parameters. With this feedback process also, the system of the present disclosure may be able to suggest more desirable parameters and seismic lines in the future.

FIG. 2 is a diagram illustrating a storage device storing seismic data in one embodiment. A storage device 212 may store files, which include seismic datasets. These datasets can include images in in-line and cross-line directions of a 3-dimenational (3D) seismic image. For instance, 2-dimensional (2D) array of pixel values representing seismic line data ("slice" of a data volume in inline or crossline or time/depth direction) and 3-D array of pixel values representing 3-D seismic images may be stored. In some embodiments, seismic surveys (seismic data or dataset) can be stored as raw SEGYs (industry standard binary files, developed by Society of Exploration Geophysicists (SEG) for storing geophysical data) or stored in a relational or non-structured query language (NoSQL) database. This dataset represents a collection of seismic traces. A seismic trace can be seen as an array of values that ultimately constitute the columns of pixels of a seismic image. Seismic images may be extracted on demand from these surveys or previously extracted and stored as image files (e.g., tiff files).

Figure 3:
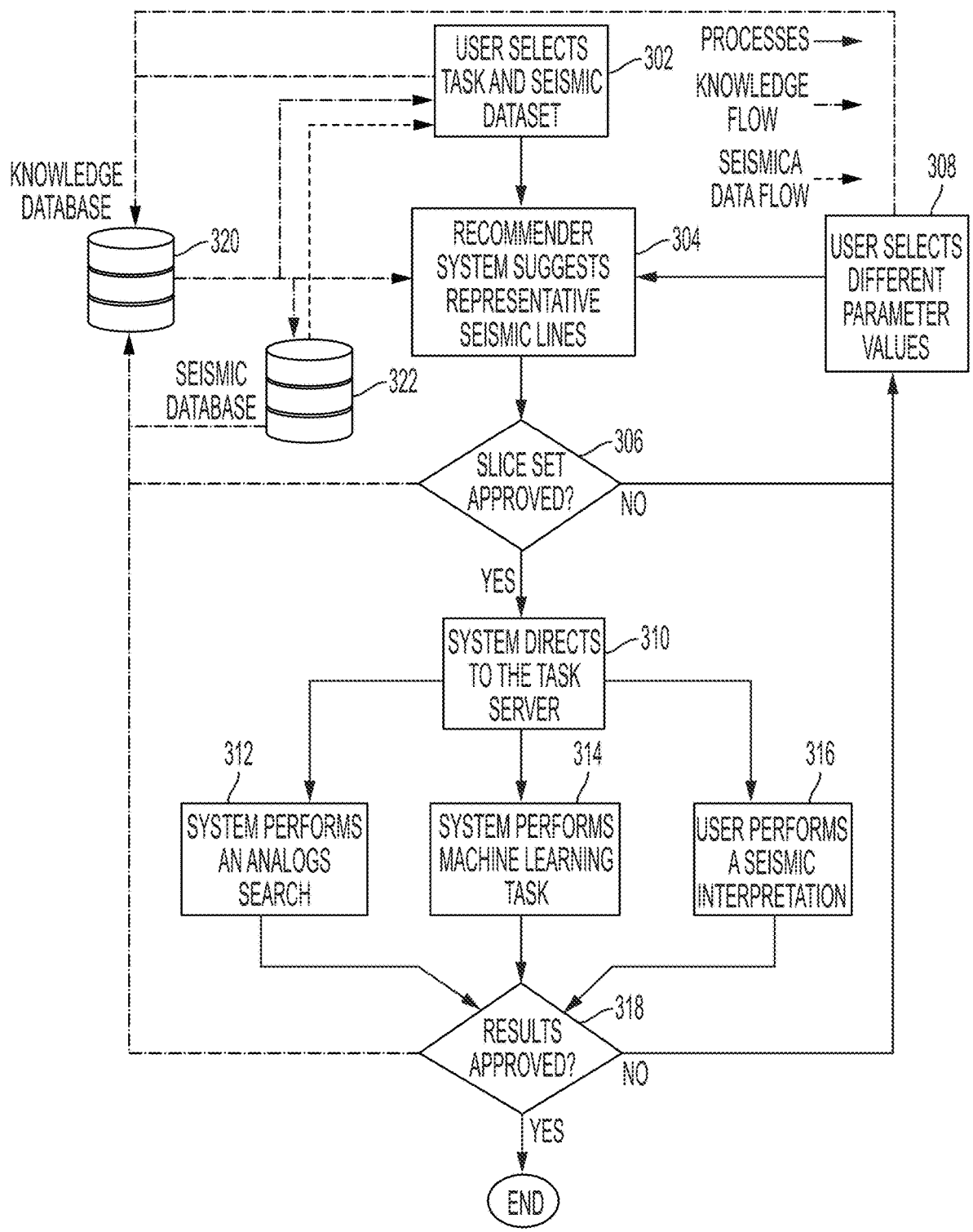
FIG. 3 is a flow diagram illustrating a method of presenting seismic data representation in one embodiment.

FIG. 3 is a flow diagram illustrating a method of presenting seismic data representation in one embodiment. In one aspect, one or more hardware processors may implement or execute the method. At 302, a hardware processor shows or presents, for example, via a user interface display screen or another interactive device, a set of tasks and parameters selected based on previous interactions and regional information. Examples of tasks may include performing an analogous seismic dataset search, performing a machine learning task and performing a seismic interpretation. Other tasks may be contemplated. The parameter values can be suggested automatically according to the selected task, for example, selected by a user. For instance, the user may select a task to perform given a list of tasks, and a hardware processor may automatically provide parameter suggestions. Examples of parameters may include, but are not limited to, tile size, texture descriptor and clustering algorithm. In some embodiments, the value of a parameter is recommended based on a statistical analysis of the values for that parameter that led to successful results in previous executions for similar tasks. In some embodiments, user feedback can be also used to determine the value of a parameter, for example, shown at 306-318. Seismic dataset may be presented from accessing a seismic database 322, which stores seismic survey or seismic data. In another aspect, a user may select a task and a set of parameters, and one or more hardware processors executing the method may receive a user selection. User interactions can be stored in a knowledge database 320.

At 304, based on the task selected and parameters retrieved from the knowledge database and/or selected by a user, a set of seismic lines are recommended determined to best summarize the seismic data associated with the task and parameters. The recommended seismic lines are presented, for example, via the user interface display screen.

At 306, a user can inspect the recommended lines and provide feedback, which feedback is received and stored in the knowledge database 320. A feedback may include a user approving the presented set of seismic lines determined to best summarize the seismic data associated with the task and parameters. A feedback may also include a user disapproving the presented set of seismic lines. A hardware processor implementing a method in one embodiment can allow the user to select different parameter values, for example, so that a different set of seismic lines can be determined and presented. At 308, for instance, a user may change the parameters to improve the recommendation, for instance, via the user interface display screen. For example, at 308, a hardware processor implementing or executing a method in one embodiment receives different parameter values a user may enter and may repeat the processing at 304. User changes are received and stored in the knowledge database 320, for instance, for future use. A seismic database 322 stores and provides access to seismic surveys (also referred to as seismic data). In some embodiments, the recommended seismic lines can be stored as pointers or indexes to the actual seismic data in 322. For example, the recommendation (a list or alike) can be stored in 320 while the actual seismic lines are already stored in 322.

At 310, a hardware processor implementing a method in one embodiment feeds the set of seismic lines to an application according to the selected task. Examples of an application may include, but are not limited to, an application which may perform an analogs search, an application which may perform a machine learning task, and an application which may perform a seismic interpretation. For example, at 312, a hardware processor implementing or executing a method in one embodiment may automatically execute or open an application or functionality which searches for analogous seismic data analogous to the input set of seismic lines. Such an application may also build a ranked list of analogous seismic data. As another example, at 314, a hardware processor implementing or executing a method in one embodiment may automatically execute or open an application or functionality performing a machine learning task. Such an application, based on the input seismic lines, performs a construction of a machine learning model. For instance, the input seismic lines can be used as a training dataset to train a machine learning model, which may perform classification of seismic data. Yet as another example, at 316, a hardware processor implementing or executing a method in one embodiment may automatically execute or open an application or functionality performing seismic interpretation, using the set of seismic lines, for instance, indicating the set of seismic lines as those that best represent the seismic data associated with the parameters, e.g., entered at 302 or 308. At 318, a user may be allowed to approve, e.g., via a user interface, a result or results provided by one or more of the applications executed at 312, 314, and/or 316. Based on the result, e.g., a user may input another set of parameter values at 308, and repeat the processing at 304.

As an example use case, consider that a company receives a seismic survey of a new frontier or region. This new data (seismic survey) should be analyzed in deciding whether to explore the region. Former projects with seismic data may leverage the knowledge about the new survey. For instance, using previous knowledge about similar areas can save performing redundant work which may take a long time. With a methodology of the present disclosure, in one embodiment, analogous list of surveys which are analogous to the received new seismic survey may be uncovered, for instance, for seismic processing, finding similar geology, and as a starting point for machine learning models. A methodology of the present disclosure, in one embodiment, can provide comparison between many seismic dataset. The representation using seismic lines is efficient and accelerates the process of finding analogous seismic data even in an extensive dataset with many seismic surveys. Machine learning models may be created based on the new seismic survey to have a first approximation of the possible geological structures in the region. Selection of a more representative set of input data for training and validation improves machine learning (ML) models, for instance, in speed and accuracy. A created machine learning model may be refined by performing a seismic interpretation using analogous data. Selection of a more representative set of seismic lines can accelerate an expert's analysis by allowing the expert to focus on the specific areas of the seismic activity.

An example use case for deep learning model transfer is described below, for example, with reference to FIG. 3. Consider that an expert (or user) selects a new seismic survey as input, for instance, as shown at 302. The knowledge base (KB) 320 has already stored the location and all regional information about that area. The expert asks for a list of analogous seismic dataset along with their trained deep learning models for seismic facies segmentation. Briefly, seismic facies refer to 3-D seismic units, which include reflection parameters, for example, continuity, chaoticity, amplitude, frequency, and/or others, which describe depositional environment. Processing shown at 304 and 306 returns a set of seismic lines which are the most representative lines regarding seismic facies in the input seismic survey. The expert may validate whether the set exemplifies well the geology in that region. Processing shown at 310 and 312 may call a server, an application or a functionality, to perform an analogous seismic data search using the set of seismic lines. Along with each analogous dataset, a methodology of the present disclosure in one embodiment may return a trained deep learning model associated with that analogous dataset for seismic facies segmentation. Processing shown at 318 allows the expert to select the best model for that user's task, for instance, via interacting with a user interface. Referring to processing shown at 310, 314 and 318, the expert or user may manually label each key seismic line (e.g., associated with the input seismic survey) and "fine-tune" the model by training the model using the labeled key seismic line. The expert or user may apply the "fine-tuned" model on the whole input seismic dataset.

An example use case which can recover analogous list of seismic datasets is described below, for example, with reference to FIG. 3. Consider that an expert (or user) selects a new seismic survey as input, for instance, as shown at 302. The knowledge base (KB) 320 may have already stored the location and all regional information about that area. The expert asks for a list of analogous seismic datasets to study possible seismic post-processing techniques to attenuate noise. A system in one embodiment may look for surveys (seismic data) that have such kind of information. Processing shown at 304 and 306 may return a set of seismic lines that represent the type of noises in the data. The expert may validate whether the returned set exemplifies the noise presented in the survey. Processing shown at 310, 312 and 318 calls an application or the like to perform an analogous dataset search using the set of seismic lines (e.g., returned at 304). The expert is allowed to navigate through the list and may gain insights about which post-processing technique would better attenuate the noise in the seismic survey. For instance, the system in one embodiment may present a list of post-processing techniques based on previous tasks already catalogued in the system. The user may be also allowed to create new tasks. Responsive to the new task being created, the system may associate the new task with the seismic datasets. For instance, in the case of noise attenuation, the system associates this task with seismic surveys that were processed using such technique.

Figure 4:
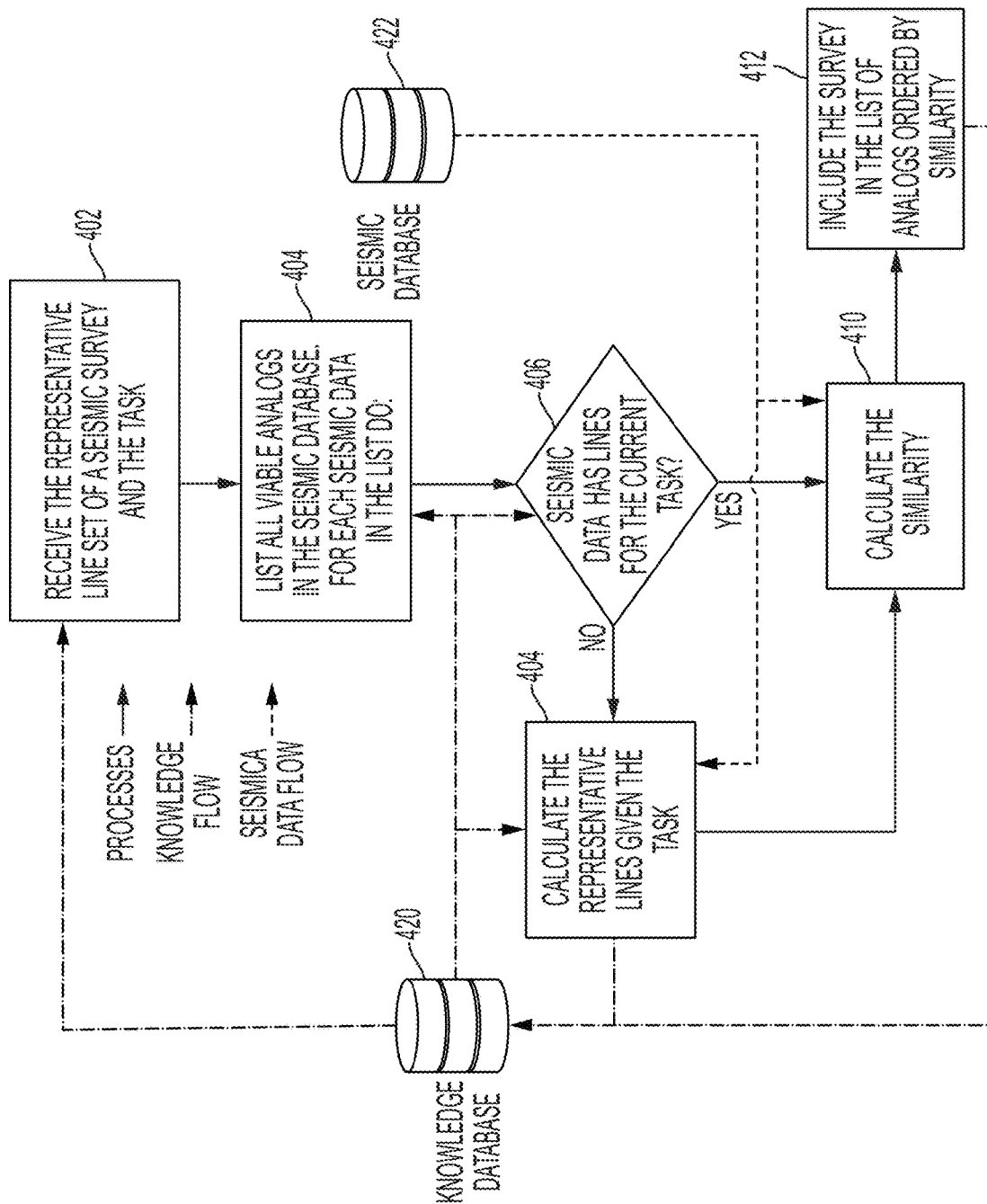
FIG. 4 is a diagram illustrating a method of performing an analogous search in one embodiment.

FIG. 4 is a diagram illustrating a method of performing an analogous search (e.g., shown at 312 in FIG. 3) in detail in one embodiment. In one aspect, one or more hardware processors may implement or execute the method. At 402, a hardware processor implementing or executing a method in one embodiment may receive a representative set of seismic lines associated with a given seismic survey and a task to be performed. For instance, a user may enter as input the representative set of seismic lines and an associated survey. In another aspect, a user may enter a survey and given the survey, a hardware processor implementing or executing a method in one embodiment may automatically retrieve the representative set of seismic lines associated with the user entered survey from a knowledge database 420. For example, the seismic survey can be one selected by a user (e.g., FIG. 3, at 302); the representative seismic lines can be one or more seismic lines recommended automatically by a system (e.g., FIG. 3 at 304). (FIG. 3). A task may be finding a specific type of analogous data.

At 404, a hardware processor implementing or executing a method in one embodiment may list all possible analogous data in the seismic database 422. Based on the given task, a hardware processor implementing or executing a method in one embodiment may filter the seismic surveys based on a knowledge database 420, and only the analogous data which satisfy the given task may be processed. For instance, seismic data (e.g., stored in seismic database 422) may be filtered to obtain the analogous data using contextual and/or geological knowledge present in the knowledge database 420, for example, keeping datasets from analogous basins and discarding the others. For instance, if the task is to attenuate noise, only seismic data processed for noise attenuation may be listed or presented.

At 406, a hardware processor implementing or executing a method in one embodiment may query the knowledge database 420 for a set of representative seismic lines for the given task associated with analogous seismic data found at 404. For instance, the parameters that are used to select the representative lines for a task may vary. For example, parameters or parameter values of tile size, texture descriptor, clustering algorithm, may vary from task to task. In some embodiments, the system tries to find representative lines computed with parameter values suitable for the specified task. If none exists, the system may compute new representative lines at 408 for that dataset and associate the new representative lines with the current task. If no representative seismic line is found in the knowledge database 420, a hardware processor implementing or executing a method in one embodiment may compute representative lines given the task at 408. At 408, a hardware processor implementing or executing a method in one embodiment calculates the representative seismic lines given the task and data from a seismic database 422. The computed representative seismic lines with associated task may be stored in the knowledge database 420, for example, as a structured data.

At 410, a hardware processor implementing or executing a method in one embodiment may calculate similarity between two seismic surveys (a given seismic survey at 402 and an analogous seismic survey found in 404) by comparing each representative seismic line associated with the two seismic surveys (e.g., seismic datasets). As an example, in one embodiment, a general algorithm may model the tiles (e.g., shown in FIG. 5) in the representative seismic lines of the two seismic surveys as elements in two mathematical sets. In this way, in one embodiment, the classical Hausdorff metric may be used to measure the distance (similarity) between the two seismic datasets. With this metric, neither the number of tiles nor the number of representative lines in the seismic surveys being compared is required to match exactly. Seismic surveys may have many, e.g., thousands of seismic lines. In the case of the recommended (representative) seismic lines, the number recommended may be a parameter of the algorithm which may be defined by the user or suggested by the system. A final similarity score may depend on a given task. For instance, for noise attenuation, similarity D between two seismic surveys S1 and S2 can be calculated as the maximum similarity computed between the similarity of their representative slices.

At 412, a hardware processor implementing or executing a method in one embodiment may include the survey whose representative line set is received in 402, in the list of analogous surveys ordered by its similarity. The survey and associated information (e.g., including the list of analogous surveys ordered by similarity to the survey) may be stored in the knowledge database 420.

Figure 5:
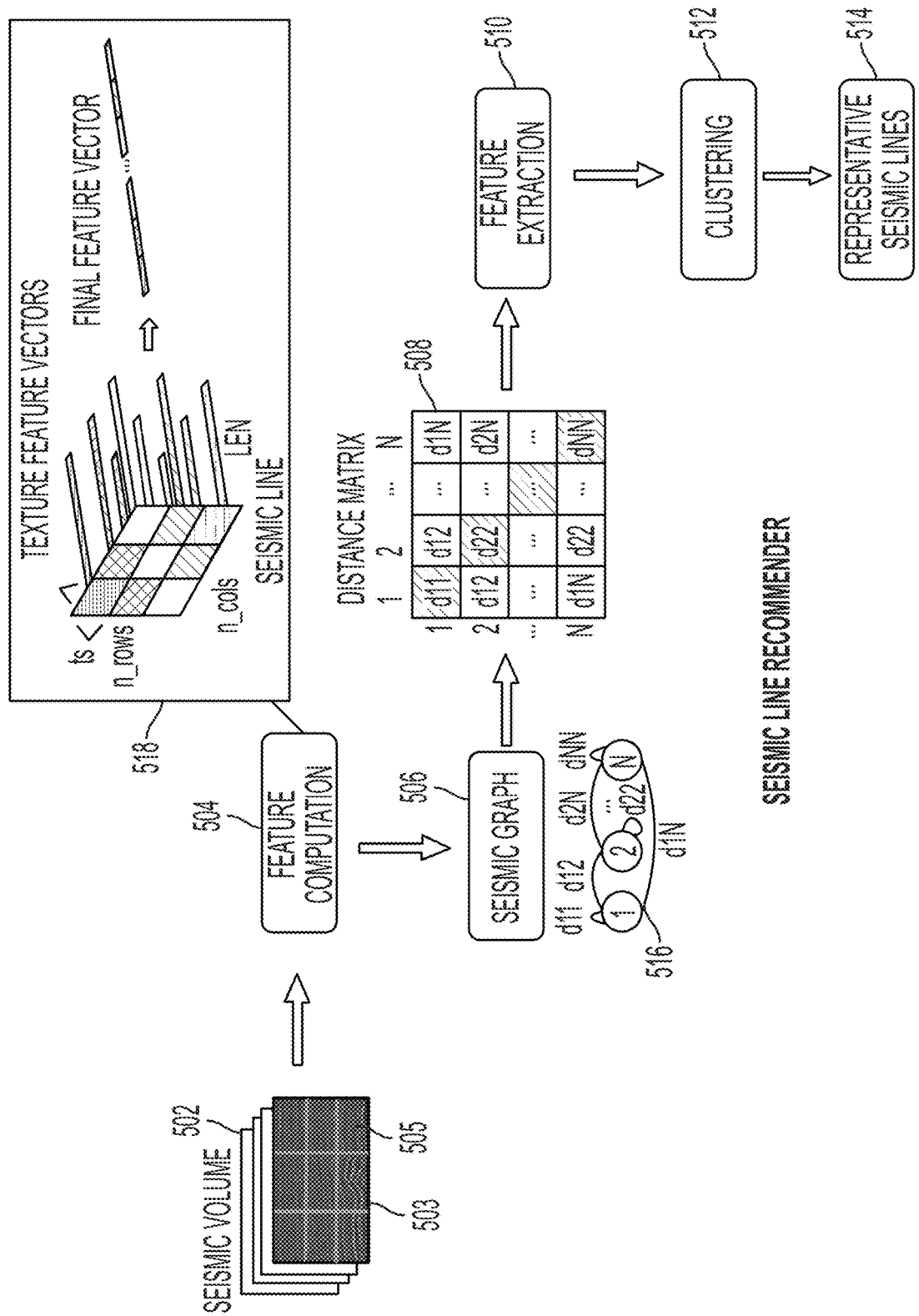
FIG. 5 is a diagram illustrating seismic line recommender in one embodiment.

FIG. 5 is a diagram illustrating a function of a seismic line recommender in one embodiment. A seismic image can be divided into tiles as shown at 502, according to an input parameter which defines the tile size, e.g., in number of pixels. The division may take into consideration the scale of the structures in the dataset. For instance, while larger tiles may be suitable for large structures, smaller tiles provide a finer description that may capture small differences in the datasets. For instance, seismic lines (e.g., 2-dimensional data array) 503 in a seismic dataset (e.g., 3-dimensional data array) can be divided into tiles (e.g., 2-dimensional data array), and for each tile 505 a texture descriptor (also referred to as a feature vector) can be computed.

For each tile a feature vector is computed, shown at 504. This feature vector may be a texture feature such as Gray Level Co-occurrence Matrix (GLCM) and Local Binary Pattern (LBP) or high-level patterns such as chaotic, parallel, and/or another pattern. An example feature vector is shown at 518. A feature vector is also referred to as a texture descriptor. The texture descriptors that describe seismic lines can be compared (distance measure) and a seismic graph may be built. In this graph, the vertices represent seismic lines and the edges represent the distance between each pair of seismic lines. At 506, a seismic graph, which includes nodes and edges, is computed in which the nodes represent the feature vector of a seismic line image and the edges represent the distance between the feature vectors of a pair of seismic line images. An example seismic graph is shown at 516. At 508, based on the seismic graph, a distance matrix (adjacency matrix) is computed. Each column and row in this matrix represents a seismic line and the cells represent the distance between the corresponding pair of seismic line images. That is, each cell corresponds to a distance between the seismic lines represented by each row, column pair.

At 510, an optional feature extraction may be performed, for example, depending on a clustering algorithm used at 512. For example, for a method such as K-means clustering algorithm, the eigenvalues and eigenvectors of the distance matrix generated at 508 may be computed. Eigenvalues and eigenvectors are used as input to a clustering algorithm that divides the seismic dataset into similar regions. In one aspect, the eigenvectors explain most of the variance. Algorithms like hierarchical clustering can be fed the distance matrix generated at 508.

At 512, a clustering algorithm is executed to group the seismic lines of a seismic dataset. At 514, a representative seismic line from each group may be selected and presented or output. For example, from each group a representative seismic line is taken, e.g., the seismic line image closest to the mean or median of the group. The processing shown in FIG. 5 can be performed for each of multiple seismic datasets or volumes.

Figure 6:
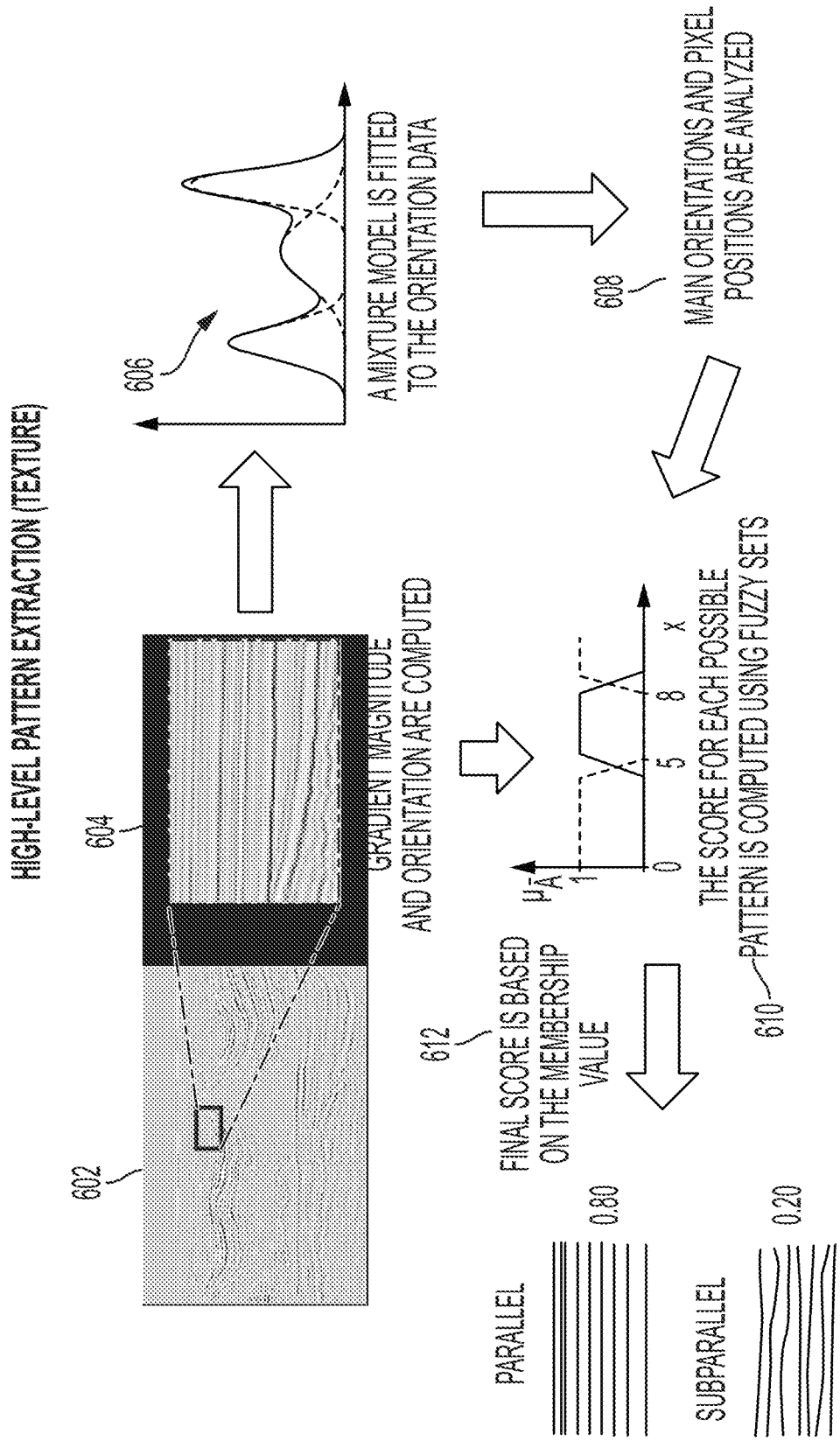
FIG. 6 is a diagram illustrating a pattern extraction in one embodiment.

FIG. 6 is a diagram illustrating a pattern extraction method, for feature vector computation, in one embodiment. For instance, feature vector generation at 504 in FIG. 5 may implement a method shown in FIG. 6, which shows a high-level texture pattern extraction in one embodiment. At 602, an image tile is selected for processing. The method shown in FIG. 6 may be performed for all tiles. At 604, gradient orientation and magnitude are computed for the tile. At 606, a Gaussian mixture model is fitted to the orientation data. At 608, main orientations are extracted and their corresponding pixel positions (centroid) are analyzed. At 610, magnitude, orientations and positions feed a set of fuzzy sets which return a membership value for each high-level pattern. For instance, a score for each possible pattern is computed using fuzzy sets. At 612, a final score is determined based on the membership value. The data computed at 604 can be directly used at 610, as shown by the arrow from 604 to 610. In another aspect, the step at 610 may use data derived by the processing at 606 and 608.

Figure 7:
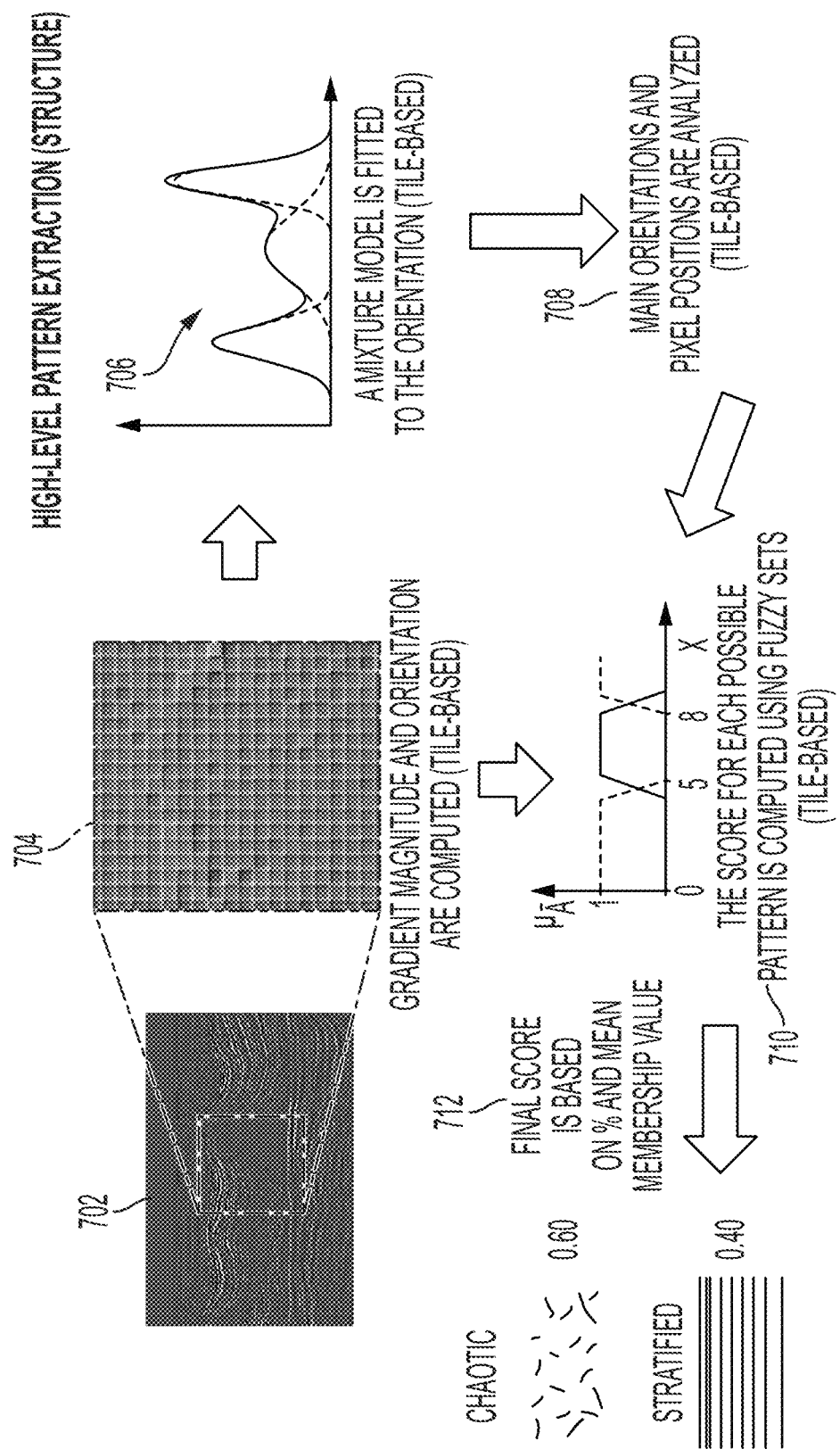
FIG. 7 is another diagram illustrating a pattern extraction in one embodiment.

FIG. 7 is another diagram illustrating a pattern extraction, for feature vector computation, in one embodiment. For instance, feature vector generation at 504 in FIG. 5 may implement a method shown in FIG. 7, which shows a high-level structure pattern extraction in one embodiment. At 702, an image tile is selected and divided again into sub-tiles. At 704, gradient orientation and magnitude are computed for each sub-tile. At 706, a Gaussian mixture model is fitted to the orientation data. At 708, main orientations are extracted and their corresponding pixel positions (centroid) are analyzed. At 710, magnitude, orientations and positions feed a set of fuzzy sets which return a membership value for each high-level pattern. For instance, a score for each possible pattern is computed using fuzzy sets. At 712, a final score is determined based on the membership value and a percentage of the original tile covered by that pattern.

Figure 8:
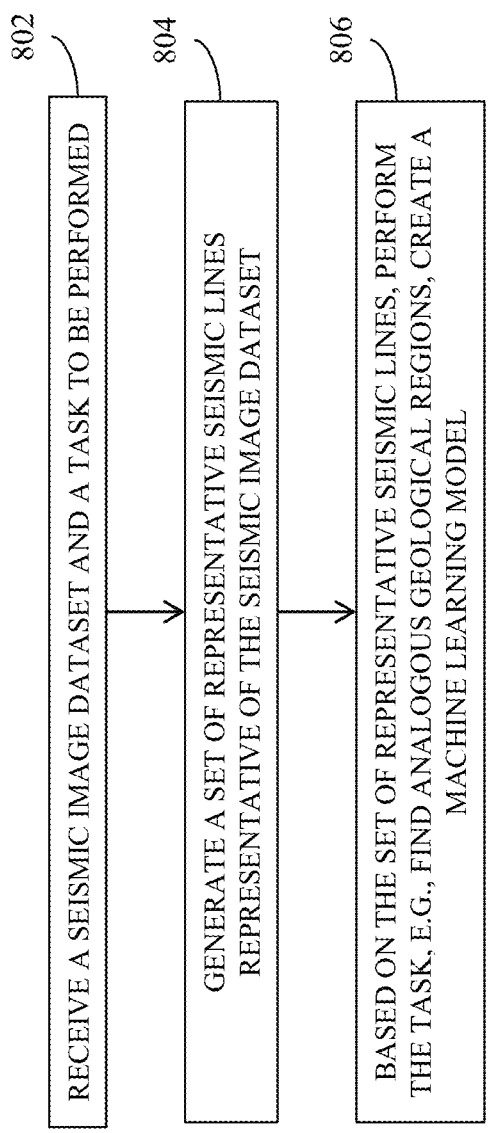
FIG. 8 is a diagram illustrating a method of determining seismic data representation in one embodiment.

FIG. 8 is a diagram illustrating a method of determining seismic data representation in one embodiment. The method may be implemented or executed by a hardware processor, for example, coupled with a memory device. At 802, a seismic dataset and a task to be performed with the seismic dataset may be received. The seismic dataset may be a seismic survey, e.g., an image scan of the Earth's region, subsurface. At 804, a representative seismic line representative of the seismic dataset is generated. The representative seismic line includes pixel data representative of the seismic dataset. The representative seismic line may be a set of representative seismic lines, for example, one or multiple representative seismic lines. A user may be allowed to evaluate the generated representative seismic line, and change parameters and repeat the generating in order to have different representative seismic line returned. At 806, based on the representative seismic line, the task may be performed. In one aspect, the task may include at least finding an analogous geological region by searching for an analogous seismic dataset existing in a seismic database stored on a storage device, by comparing the representative seismic line with the analogous seismic dataset's representative seismic line. In another aspect, the task may include generating a machine learning model that classifies geological structures in a region corresponding to the seismic dataset based on the representative seismic line. Generating the machine learning model may include retrieving at least one existing machine learning model associated with the analogous seismic dataset and refining the existing machine learning model with the pixel data of the representative seismic line by using the pixel data of the representative seismic line as training data.

In one aspect, the representative seismic line may be generated as follows. Each of seismic lines of the seismic dataset may be divided into n-row by m-column tiles, wherein n and m are configured integers. A feature value associated with each of the tiles may be computed, and a feature vector associated with a seismic line may be generated based on the features values associated with the tiles of the seismic line. For instance, all feature values of a seismic line may be appended into a feature vector. A graph may be generated, which include nodes representing the seismic lines and edges between the nodes representing a distance between feature vectors of the nodes the edges connect. An adjacency matrix may be generated, which represents the graph. The seismic lines (nodes of the graph) may be clustered by executing an unsupervised clustering algorithm based on the adjacency matrix. At least one seismic line may be selected from at least one cluster as a representative of the cluster. In one aspect, the feature value may include a geological texture value. In one aspect, the feature value may include a geological structure value.

Figure 9:
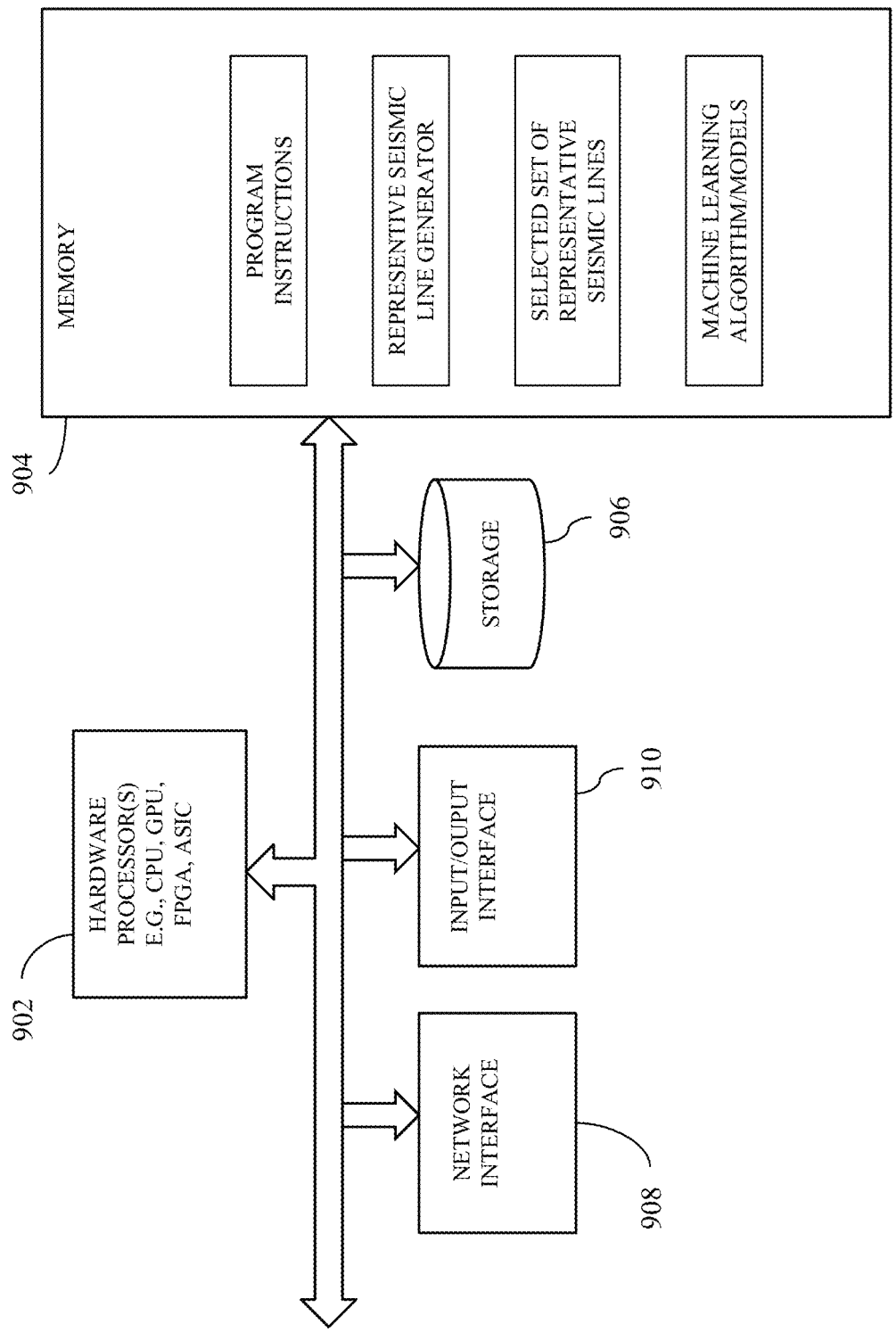
FIG. 9 is a diagram showing components of a system in one embodiment that determines and provides representative seismic data.

FIG. 9 is a diagram showing components of a system in one embodiment that determines and provides representative seismic data. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and generate a set of representative seismic lines given a seismic dataset. A task to be performed may be also received by one or more processors 902. The memory device 904 may include random access memory (RAM), read-only memory (ROM) or another memory device, and may store data and/or processor instructions for implementing various functionalities associated with the methods and/or systems described herein. One or more processors 902 may execute computer instructions stored in the memory or received from another computer device or medium. The memory device 904 may, for example, store instructions and/or data for functioning of one or more hardware processors 902, and may include an operating system and other program of instructions and/or data. One or more hardware processors 902 may receive input seismic data or dataset and a task to be performed. In one aspect, knowledge base and seismic database may be stored on a storage device 906 or received via a network interface 908 from a remote device, and may be temporarily loaded into the memory device 904 for generating a set of representative seismic lines and/or other operations. One or more hardware processor 902 may also build a machine learning model, which may be stored on a storage device 906 and loaded to the memory device 904, for example, for execution by one or more hardware processors 902. One or more hardware processors 902 may be coupled with interface devices such as a network interface 908 for communicating with remote systems, for example, via a network, and an input/output interface 910 for communicating with input and/or output devices such as a keyboard, mouse, display, and/or others.

Figure 10:
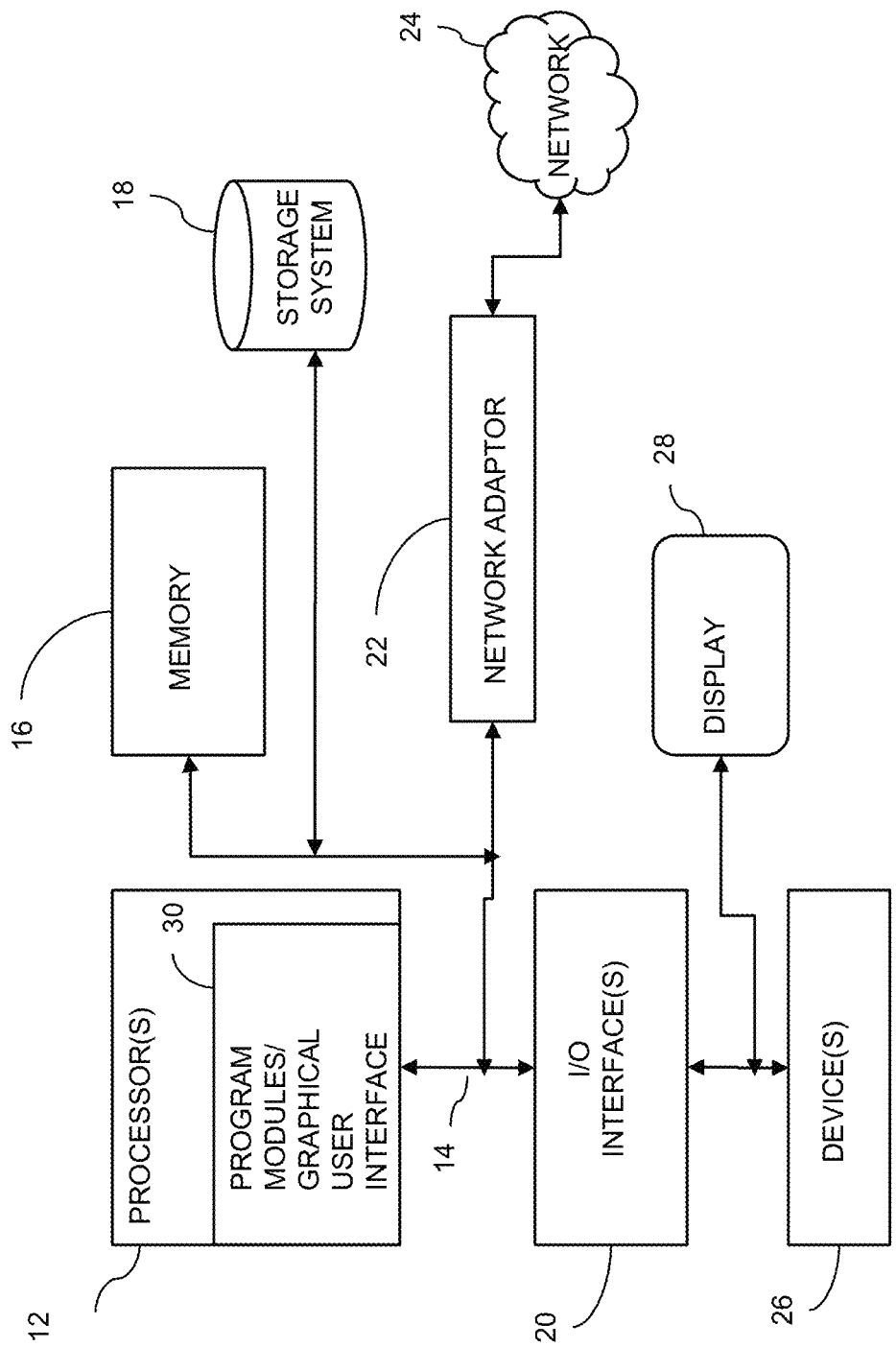
FIG. 10 illustrates a schematic of an example computer or processing system that may implement a system in one embodiment of the present disclosure.

FIG. 10 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others.

Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
receiving a seismic dataset and a task to be performed with the seismic dataset;
generating a representative seismic image representing the seismic dataset based on generating a representative seismic line, the representative seismic image being a most representative seismic image that is representative of the seismic dataset, the representative seismic line indicative of pixel data representative of the seismic dataset,
the generating the representative seismic image comprising:
for each of seismic lines of the seismic dataset, wherein said each of seismic lines includes pixel values representing an image slice of a 3-dimensional geological image volume, dividing the seismic line into n-row by m-column tiles of said pixel values, wherein n and m are configured integers, computing a feature value associated with each of the tiles, and generating a feature vector indicating the features values associated with the tiles, wherein a seismic line is associated with a feature vector;
generating a graph with nodes representing the seismic lines and edges between the nodes representing a distance between feature vectors of the nodes the edges connect;
computing an adjacency matrix representing the graph;
clustering the seismic lines by an unsupervised clustering algorithm; and
selecting at least one seismic line from at least one cluster representative of the at least one cluster; and
based on the representative seismic line, performing the task, the task indicating at least finding an analogous geological region by searching for an analogous seismic dataset existing in a seismic database by comparing the representative seismic line with the analogous seismic dataset's representative seismic line, wherein the task further includes performing a deep learning model transfer by retrieving a deep learning model associated with the analogous geological region, and further training the deep learning model using pixel data of the representative seismic image as training data,
wherein representation of the seismic dataset is driven by machine learning to select most representative seismic images and use the selected representation to search for analogous seismic images.

2. The computer-implemented method of claim 1, wherein the deep learning model is trained to classify geological structures in a region corresponding to the seismic dataset based on the representative seismic line.

3. The computer-implemented method of claim 1, wherein the generating a representative seismic line comprises regenerating the representative seismic line based on receiving different parameter data.

4. The computer-implemented method of claim 1, wherein the feature value comprises a geological texture value.

5. The computer-implemented method of claim 1, wherein the feature value comprises a geological structure value.

6. A system comprising:
at least one hardware processor; and
a memory device coupled with the at least one hardware processor;
the at least one hardware processor configured to at least:
receive a seismic dataset and a task to be performed with the seismic dataset;
generate a representative seismic image representing the seismic dataset based on generating a representative seismic line, the representative seismic image being a most representative seismic image that is representative of the seismic dataset, the representative seismic line indicative of pixel data representative of the seismic dataset, wherein the at least one hardware processor generates the representative seismic image by:
for each of seismic lines of the seismic dataset, wherein said each of seismic lines includes pixel values representing an image slice of a 3-dimensional geological image volume, dividing the seismic line into n-row by m-column tiles of said pixel values, wherein n and m are configured integers, computing a feature value associated with each of the tiles, and generating a feature vector indicating the features values associated with the tiles, wherein a seismic line is associated with a feature vector;

generating a graph with nodes representing the seismic lines and edges between the nodes representing a distance between feature vectors of the nodes the edges connect;

computing an adjacency matrix representing the graph;

clustering the seismic lines by an unsupervised clustering algorithm; and selecting at least one seismic line from at least one cluster representative of the at least one cluster; and based on the representative seismic line, perform the task, the task indicating at least finding an analogous geological region by searching for an analogous seismic dataset existing in a seismic database by comparing the representative seismic line with the analogous seismic dataset's representative seismic line, wherein the task further includes performing a deep learning model transfer by retrieving a deep learning model associated with the analogous geological region, and further training the deep learning model using pixel data of the representative seismic image as training data, wherein representation of the seismic dataset is driven by machine learning to select most representative seismic images and use the selected representation to search for analogous seismic images.

7. The system of claim 6, wherein the deep learning model is trained to classify geological structures in a region corresponding to the seismic dataset based on the representative seismic line.

8. The system of claim 6, wherein the at least one hardware processor regenerates the representative seismic line responsive to receiving different parameter data.

9. The system of claim 6, wherein the feature value comprises a geological texture value.

10. The system of claim 6, wherein the feature value comprises a geological structure value.

11. A computer program product comprising a computer readable storage medium having program instructions embodied therewith, the program instructions executable by a device to cause the device to:

receive a seismic dataset and a task to be performed with the seismic dataset;

generate a representative seismic image representing the seismic dataset based on generating a representative seismic line, the representative seismic image being a most representative seismic image that is representative of the seismic dataset, wherein the representative seismic image is generated by at least:

for each of seismic lines of the seismic dataset, wherein said each of seismic lines include pixel values representing an image slice of a 3-dimensional geological image volume, dividing the seismic line into n-row by m-column tiles of said pixel values, wherein n and m are configured integers, computing a feature value associated with each of the tiles, and generating a feature vector indicating the features values associated with the tiles, wherein a seismic line is associated with a feature vector;

generating a graph with nodes representing the seismic lines and edges between the nodes representing a distance between feature vectors of the nodes the edges connect;

computing an adjacency matrix representing the graph;

clustering the seismic lines by an unsupervised clustering algorithm; and selecting at least one seismic line from at least one cluster representative of the at least one cluster, the representative seismic line indicative of pixel data representative of the seismic dataset; and based on the representative seismic line, perform the task, the task indicating at least finding an analogous geological region by searching for an analogous seismic dataset existing in a seismic database by comparing the representative seismic line with the analogous seismic dataset's representative seismic line, wherein the task further includes performing a deep learning model transfer by retrieving a deep learning model associated with the analogous geological region, and further training the deep learning model using pixel data of the representative seismic image as training data, wherein representation of the seismic dataset is driven by machine learning to select most representative seismic images and use the selected representation to search for analogous seismic images.

12. The computer program product of claim 11, wherein the deep learning model is trained to classify geological structures in a region corresponding to the seismic dataset based on the representative seismic line.

13. The computer program product of claim 11, wherein the representative seismic line is generated by at least regenerating the representative seismic line based on receiving different parameter data.

14. The computer program product of claim 11, wherein the feature value comprises at least one of a geological texture value and a geological structure value.

15. The computer-implemented method of claim 1, further including using the representation of the seismic dataset to explore a geological region represented by the seismic dataset.

16. The system of claim 1, wherein the at least one hardware processor is further configured to use the representation of the seismic dataset to explore a geological region represented by the seismic dataset.

17. The computer program product of claim 11, wherein the device is further caused to use the representation of the seismic dataset to explore a geological region represented by the seismic dataset.

* * * * *